US009056580B2

United States Patent
Baldsiefen et al.

(10) Patent No.: US 9,056,580 B2
(45) Date of Patent: Jun. 16, 2015

(54) VEHICLE ILLUMINATED LOADING FLOOR AND PROFILED ELEMENT FOR A LOADING FLOOR

(71) Applicant: Ford Global Technologies, LLC, Dearborn, MI (US)

(72) Inventors: Lothar Baldsiefen, Cologne (DE); Dino Valter, Duren (DE); Rene A. Huth, Lohmar (DE)

(73) Assignee: Ford Global Technologies, LLC, Dearborn, MI (US)

( * ) Notice: Subject to any disclaimer, the term of this patent is extended or adjusted under 35 U.S.C. 154(b) by 77 days.

(21) Appl. No.: 13/798,933

(22) Filed: Mar. 13, 2013

(65) Prior Publication Data

US 2013/0250594 A1 Sep. 26, 2013

(30) Foreign Application Priority Data

Mar. 23, 2012 (DE) .......................... 10 2012 204 732

(51) Int. Cl.
*B60Q 3/06* (2006.01)
*B60P 7/08* (2006.01)
*B62D 25/20* (2006.01)

(52) U.S. Cl.
CPC ................. *B60Q 3/06* (2013.01); *B60P 7/0815* (2013.01); *B62D 25/2054* (2013.01)

(58) Field of Classification Search
CPC .. B60Q 3/0206; B60Q 3/0246; B60Q 3/0283; B60Q 3/044; B60Q 3/06
USPC ....................................................... 362/496
See application file for complete search history.

(56) References Cited

U.S. PATENT DOCUMENTS

| 3,440,415 | A | * | 4/1969 | Spiteri .......................... 362/485 |
| 3,877,671 | A | * | 4/1975 | Underwood et al. ..... 248/346.03 |
| 5,483,427 | A | * | 1/1996 | Dealey et al. .................. 362/485 |
| 5,599,086 | A | * | 2/1997 | Dutta ............................ 362/490 |
| 6,238,075 | B1 | * | 5/2001 | Dealey et al. .................. 362/551 |
| 6,485,080 | B2 | * | 11/2002 | Hansen et al. ............. 296/65.03 |
| 8,506,141 | B2 | * | 8/2013 | Cannon et al. ................ 362/490 |
| 2005/0063194 | A1 | * | 3/2005 | Lys et al. ...................... 362/545 |
| 2006/0152945 | A1 | * | 7/2006 | Lantzsch et al. .............. 362/640 |
| 2007/0008732 | A1 | * | 1/2007 | Robertson et al. ............ 362/459 |
| 2009/0134666 | A1 | * | 5/2009 | Thomsen .................. 296/193.07 |
| 2011/0149570 | A1 | * | 6/2011 | Wenzlick ................. 362/249.02 |

FOREIGN PATENT DOCUMENTS

| DE | 102012212305 A1 | | 1/2013 |
| EP | 1701860 B1 | | 8/2007 |
| EP | 1901955 B1 | | 9/2009 |
| GB | 2353769 A | * | 3/2001 |
| WO | 0138127 A1 | | 5/2001 |
| WO | WO 0138127 A1 | * | 5/2001 |

* cited by examiner

*Primary Examiner* — Britt D Hanley
*Assistant Examiner* — Matthew J Peerce
(74) *Attorney, Agent, or Firm* — Vichit Chea; Price Heneveld LLP

(57) ABSTRACT

A loading floor for a vehicle including a plurality of elongate profiled elements in a longitudinal direction, arranged adjacent to one another and connected together, wherein the loading floor has at least one through-channel in the longitudinal direction and at least one lamp for illuminating an interior of the vehicle, wherein at least one supply line is guided in the channel for supplying power to the lamp. A profiled element for such a loading floor is also provided.

20 Claims, 2 Drawing Sheets

VEHICLE ILLUMINATED LOADING FLOOR AND PROFILED ELEMENT FOR A LOADING FLOOR

FIELD OF THE INVENTION

The invention generally relates to a loading floor for a vehicle, and more particularly to an illuminated loading floor and a profiled element for such a loading floor.

BACKGROUND OF THE INVENTION

The luggage compartment of vehicles is generally provided with a loading floor fastened to a floor plate or a supporting structure of the vehicle. The loading floor is typically configured as a substantially planar surface for facilitating the loading procedure and receiving the load of the loaded goods. Moreover, when loading vehicles, it is often a problem to fasten objects securely so that the objects are fixed to the vehicle during travel. To this end, known loading floors have, for example, fixed eyes for receiving lashing straps or even fastening elements which are displaceable on loading rails. The fastening elements typically are able to be moved into a plurality of positions and on which, for example, eyes for lashing straps are arranged. The loading floor may be made up of a plurality of profiled elements which include such loading rails. In some vehicles, an optional use as a luggage compartment or as a passenger compartment is also possible. In this case, there is the option of fastening seats to the loading floor.

A loading floor with integrated loading rails is disclosed in U.S. Pat. No. 3,877,671, the loading floor consisting of individually extruded elements which are adhesively bonded together. A floor plate is disclosed in EP 1 901 955 B1 which consists of a plurality of parallel elements which in each case are fastened to a floor of a vehicle. A floor plate is disclosed in EP 1 701 860 B1 which consists of profiled rail parts and profiled floor parts and which is fastened to the floor panel of transport vehicles, wherein the profiled rail parts and profiled floor parts may be mechanically locked together. A vehicle floor is disclosed in WO 01/38127 A1, the vehicle floor being made up of a plurality of interlocking elongate profiled components, wherein some of the profiled components have grooves extending in the longitudinal direction for receiving anchoring elements for fastening a seat or a wheelchair holder.

A loading floor is described in the unpublished patent application DE 10 2011 079 337.2, which is incorporated in the present application by way of reference. The loading floor consists of a plurality of profiled elements which are connected together, wherein at least some profiled elements include at least one loading rail and at least one connecting region for connecting to a further profiled element. The loading rail has a longitudinal groove for receiving sliding blocks in a longitudinally displaceable manner and the loading rail is integrated in the respective profiled element and is configured separately from the at least one connecting region. In GB 2,353,769 A it is proposed that a vehicle floor consists of a plurality of preformed floor components which are able to be joined together and which have internal elongate channels which may be used, for example, for guiding cables.

Both when using such a loading floor for fastening seats in a vehicle intended for passenger transport and/or region of a vehicle and when using the loading floor in a luggage compartment of a vehicle, it is necessary to illuminate the space defined by the loading floor. In the known manner, the luggage compartment and/or passenger compartment may be illuminated by a lamp, for example, arranged on a wall or on the ceiling. However, it may not possible to achieve optimal illumination thereby.

It is desirable to provide a loading floor of the aforementioned type and a profiled element for a loading floor, wherein improved illumination of the interior defined by the loading floor is made possible.

SUMMARY OF THE INVENTION

According to one aspect of the present invention, a loading floor for a vehicle is provided. The loading floor includes a plurality of elongate profiled elements in a longitudinal direction, arranged adjacent to one another and connected together. The loading floor includes at least one through-channel in the longitudinal direction, at least one lamp for illuminating an interior of the vehicle and at least one supply line guided in the channel for supplying power to the lamp.

According to another aspect of the present invention, a profiled element for a loading floor of a vehicle is provided. The profiled element includes a through-channel extending in a longitudinal direction of the profiled element, at least one lamp for illuminating an interior of the vehicle, and at least one supply line guided in the channel for supplying power to the lamp.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
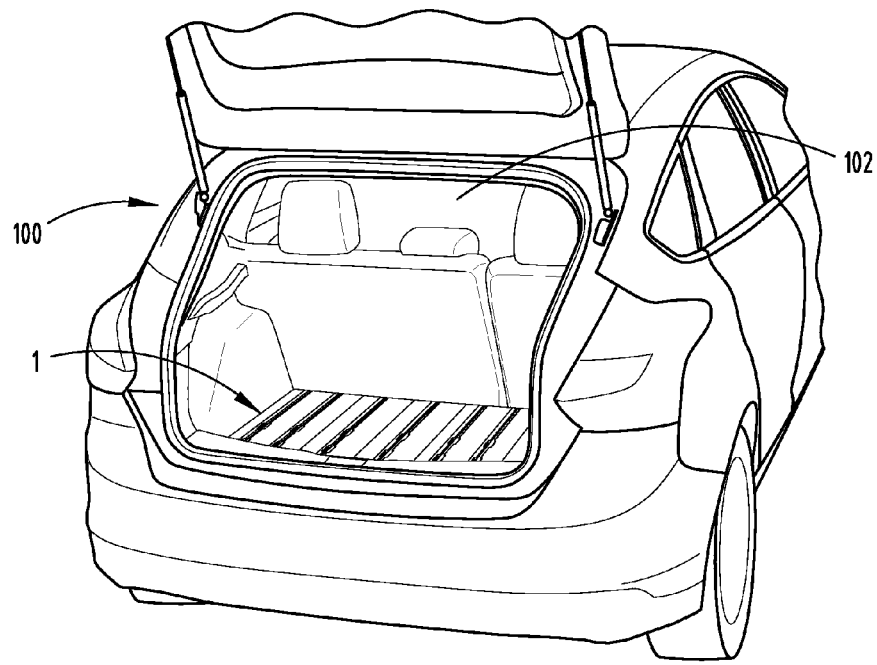
FIG. 1 is a perspective view of a vehicle luggage compartment having a loading floor, according to one embodiment.

As required, detailed embodiments of the present invention are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

A loading floor according to one embodiment is suitable, in particular, for a luggage compartment or passenger compartment of a vehicle but may also be used, for example, as wall cladding or ceiling cladding in a vehicle. The loading floor includes a plurality of elongate profiled elements which are arranged adjacent to one another and substantially parallel to one another and connected together. The profiled elements are preferably positively connected together transversely to the longitudinal direction thereof but may also, for example, be connected by a frictional connection, adhesively bonded and/or welded or connected together in a different manner. Preferably, the profiled elements are produced by extrusion, for example as aluminum extruded profiles. The loading floor may include further elements, namely protective caps at the ends or elements for fastening the loading floor to a floor plate or a supporting structure of the vehicle.

The loading floor according to one embodiment has at least one through-channel in the longitudinal direction of the profiled elements, as well as at least one lamp for illuminating an interior of the vehicle, wherein at least one supply line is guided in the channel for supplying power to the lighting means and optionally fastened therein. Preferably, at least one of the profiled elements connected together has such a channel, a lamp and a supply line. However, it is also possible that such a channel is formed simply by connecting and/or joining together two or more profiled elements for constructing the loading floor, wherein the lamp and the supply line may be assigned to one of the profiled elements. The supply line is, in particular, configured as an electrical supply line for supplying electrical power to the lamp. The electrical supply line has at least one line, wherein the loading floor may be electrically conductive and in turn suitable for closing a power circuit. The electrical supply line, however, may also include a plurality of electrical lines. The lamp may, for example, include a lighting device and a socket in which the lighting device is held, wherein the supply line is connected to the socket; in turn, the lamp may also be the lighting device which is directly connected to the supply line. Preferably, the loading floor includes a plurality of lamps which in each case are arranged on the same side of the loading floor, in particular on the side facing the interior of the vehicle.

As the loading floor has a through-channel and a lamp for illuminating an interior of the vehicle and as at least one supply line is guided in the channel for supplying power to the lamp, a loading floor is provided in which illumination of the interior of the vehicle is integrated. As a result, improved illumination of the region defined by the loading floor of the interior of the vehicle is permitted. In particular, it may be possible for improved interior illumination to be ready for use after installing the loading floor, without further cabling. The lamp may, for example, be positioned in a central region of the loading floor in the longitudinal direction. In this case, particularly good illumination of the interior may be achieved when the loading floor is not only used as a floor but also as a wall and/or ceiling of a luggage compartment or passenger compartment of the vehicle. Moreover, indirect illumination may be implemented, for example, by illuminating the internal walls of a vehicle interior from the loading floor, whereby the impression of space is increased.

The lamp may, in particular, be arranged on the surface of the loading floor and/or a profiled element forming the loading floor; in this case one or more openings may be provided in the surface of the loading floor, the openings forming the connection to the channel, for passing the supply line out of the channel to the lighting device. The lamp may, however, also be arranged in such an opening or inside the channel and, in particular, arranged such that the interior of the vehicle is illuminated through the opening. In particular, in the latter case, the lamp may be protected against mechanical damage. The opening may, for example, be configured as a through-opening in the longitudinal direction or even as a bore which has been incorporated in a profiled element which is produced, for example, as an aluminum extruded profile.

According to an exemplary embodiment, the at least one through-channel in the longitudinal direction is configured between an upper structure of a profiled element, a lower structure of the profiled element and/or at least one strut connecting the upper and lower structures of the profiled element. The upper and lower structures may have a substantially planar upper and/or lower face for forming a planar upper and/or lower face of the loading floor. To achieve a high degree of rigidity of the loading floor with low weight, the upper and lower structures are preferably spaced apart from one another and connected together by at least one bracing. The bracing may be formed, for example, by one or more struts configured perpendicularly or obliquely to the upper and/or lower structure, passing through the profiled element in the longitudinal direction. As a result, channels of the profiled elements and/or the loading floor which are present, for example, for stability reasons and for weight reasons may be used for passing through supply lines for illuminating the space. Thus it is possible to improve the illumination of the vehicle interior at minimal cost.

Preferably, the supply line is able to be connected in an end region of the channel to an on-board electrical power supply. To this end, for example, a plug may be arranged on the loading floor and/or on a profiled element of the loading floor, via which an electrical connection to a cable of the on-board power supply may be produced in a particularly simple manner when installing the loading floor in a vehicle.

It is also preferred that the loading floor has a plurality of through-channels in the longitudinal direction, in which in each case at least one supply line is guided, and that the supply lines of the plurality of channels may be connected together or independently of one another in an end region of a channel to an on-board electrical power supply of the vehicle. In particular, the supply lines of the plurality of channels may be connected together in an end region of the channels or at a front end of the loading floor by a connecting line. However, an independent connection of the supply lines of the plurality of channels to the on-board power supply may be provided in order to permit independent activation of the respective lighting devices.

According to a further embodiment, the loading floor has a plurality of lamps which have different colors, different degrees of brightness and/or different opening angles. As a result, it is possible to improve further the illumination of the interior, which may be optimally adapted to the respective space.

According to a particularly embodiment, the lamps are connected individually or in groups to different supply lines, which may be connected independently of one another to an on-board electrical power supply of the vehicle. In particular, in this case, the lamps may be activated independently of one another depending on color, brightness and/or opening angle. As a result, optimal illumination for the respective situation may be achieved.

The lighting devices of the at least one lamp may include a light-emitting diode (LED) according to one embodiment. Such lighting devices are compact and robust and have sufficient brightness and generate a low level of heat and thus may be easily integrated in a loading floor mechanically, electrically and without any problems due to heat generation. Moreover, LEDs are available in various colors. With a plurality of groups of red, green, blue (RGB) LEDs which may be activated independently of one another, for example, the color of the illumination may be adjusted as desired. Moreover, different regions of the loading floor may be marked, for example, by being illuminated in different colors.

In a particularly advantageous manner, the lighting device and/or the lamp may be an LED film strip. The strip may be integrated particularly easily in a loading floor and may already include the required supply line.

Moreover, it is preferred that the loading floor or a profiled element of the loading floor has at least one longitudinal groove and that the lamp is arranged in the longitudinal groove or an opening, in which the lamp is arranged or through which a lamp arranged in the channel illuminates, is arranged in the longitudinal groove. The longitudinal groove is, in particular, open toward an upper face of the profiled element, i.e. toward the interior of the vehicle and may, for example, be configured as a longitudinal groove of a loading rail in which a sliding block is displaceably guided, or the profiled element may in turn be configured as a loading rail. The lamp and/or opening may be arranged in a floor region or in a side region of the longitudinal groove. As a result, the lamp may be optimally protected against damage, namely when loading the luggage compartment. Moreover, this facilitates the positioning of a carpet or a friction-enhancing coating between the longitudinal grooves on the upper face of the loading floor, without concealing the lamps thereby.

According to a further embodiment, the loading floor includes an electrical connector socket for connecting further electrical devices such as consumer electronic devices. The connector socket may, for example, be configured as a socket which may be closed by a lid. The connector socket may, in particular, be integrated in a profiled element and may have a suitable connecting cable guided in the channel which may be connected in an end region of the channel to an on-board power supply of the vehicle. As a result, greater use is able to be made of the luggage compartment and/or passenger compartment of the vehicle provided with the loading floor.

A profiled element according to one embodiment for a loading floor of a vehicle has at least one channel which extends in a longitudinal direction of the profiled element and is substantially configured to pass through from one end to the other of the profiled element. Moreover, the profiled element has at least one lamp for illuminating an interior of the vehicle and at least one supply line for supplying power to the lamp, the supply line being guided in the channel. The profiled element may also include connecting elements which, for example, may be configured as latching projections and latching grooves, for connecting to further profiled elements in order to assemble a loading floor from the profiled elements. In particular, the profiled element may be configured in order to produce a loading floor of the above-described type by connecting to further profiled elements.

Referring now to FIG. 1, a vehicle 100 is illustrated having a vehicle luggage compartment 102, in the form of a hatchback automotive vehicle. An illuminated loading floor 1 is shown installed on the low surface of the vehicle luggage compartment 102. The loading floor facilitates the loading and receiving of load within the vehicle luggage compartment and provides optimal light illumination.

Figure 2:
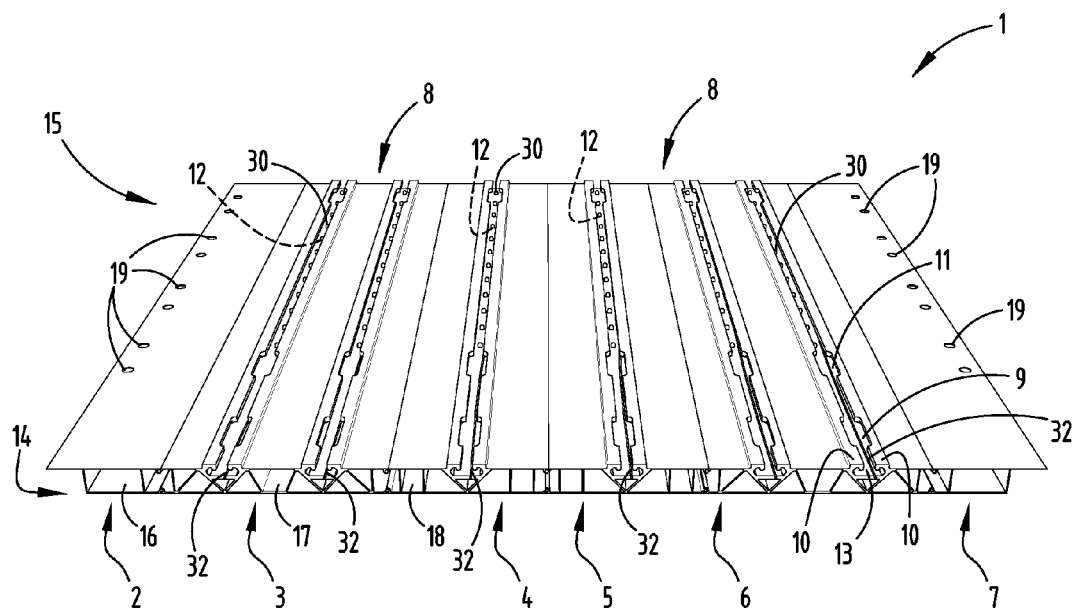
FIG. 2 is a perspective view of the loading floor.

The loading floor 1 shown in FIG. 2 of a vehicle includes a plurality of elongate profiled elements 2, 3, 4, 5, 6, 7, which are configured as edge elements 2, 7, intermediate elements 3, 6 and central elements 4, 5. In the exemplary embodiment shown in FIG. 2, the two central elements 4, 5 are of the same configuration; in addition, both intermediate elements 3, 6 are the same as one another. The edge elements 2, 7 are also the same except for the connection to the intermediate elements 3, 6. The profiled elements 2, 3, 4, 5, 6, 7 are arranged adjacent to one another and parallel to one another and connected together to form the planar loading floor 1 which may be fastened to a floor plate or a supporting structure of a vehicle.

As shown in FIG. 2, a plurality of loading rails 8 are integrated in the upper face of the substantially smooth loading floor 1. Each loading rail 8 has an upwardly open longitudinal groove 9 which in the upper region is partially narrowed by lateral projections 10, such that a sliding block inserted into the longitudinal groove 9, and not shown in FIG. 2, is only able to be removed upwardly in the recesses 11. The sliding block may be fastened, for example screwed or clamped, in the portions of the longitudinal groove 9 narrowed by the projections 10, for fixing a load.

Along the longitudinal extent of the intermediate element 6, in the base of the longitudinal groove 9 a plurality of bores 12 are arranged, the bores extending into the elongate through-channel 13 of the profiled element 6 located thereunder. Lamps 30 which includes LEDs as lighting means are arranged in the bores 12. The bores may be terminated at the top by windows to protect the LEDs 30, and through which the light produced by the LEDs 30 illuminates the interior of the vehicle. A supply line 32 for supplying electrical power to the lamps 30 is guided inside the channel 13. At a front facing end 14 or a rear facing end 15 of the loading floor 1, the supply line 32 may be connected to an on-board electrical power supply, whereby the lamps may be supplied with electrical power (not shown) as required. A closure lid, also not shown, may be provided for closing the channel 13 and for protecting from the penetration of dirt or moisture. In the exemplary embodiment shown, the intermediate elements 3, 6 in each case include two longitudinal grooves 9 configured with bores 12 and lamps arranged therein, whilst the central elements 4, 5 in each case include such a longitudinal groove 9.

The channels 16 of the edge elements 2, 7 include bores 19 which also contain lamps which may be protected against damage and/or dirt by windows inserted into the bores 19. As indicated in FIG. 2 by the greater diameter of the bores 19 relative to the bores 12, the lamps contained in the bores 19 of the edge elements 2, 7 may have a greater surface area and/or brightness than those in the bores 12 of the intermediate and central elements 3, 4, 5, 6. As a result, with the corresponding alignment of the lamps an indirect illumination of the interior of the vehicle may be achieved by illuminating the lateral walls, resulting in a more pleasant light distribution and the impression of space being able to be increased. The supply lines 32 of the lamps arranged in the bores 19 extend in the channels 16 of the edge elements 2, 7. The lamps of the edge elements 2, 7 may, for example, have a different color from the lamps of the intermediate elements and central elements 3, 4, 5, 6 and may be able to be controlled separately therefrom.

The further channels 17, 18 of the intermediate and/or central elements 3, 4, 5, 6 which do not include any lamps may be used, for example, for passing through cables.

Figure 3:
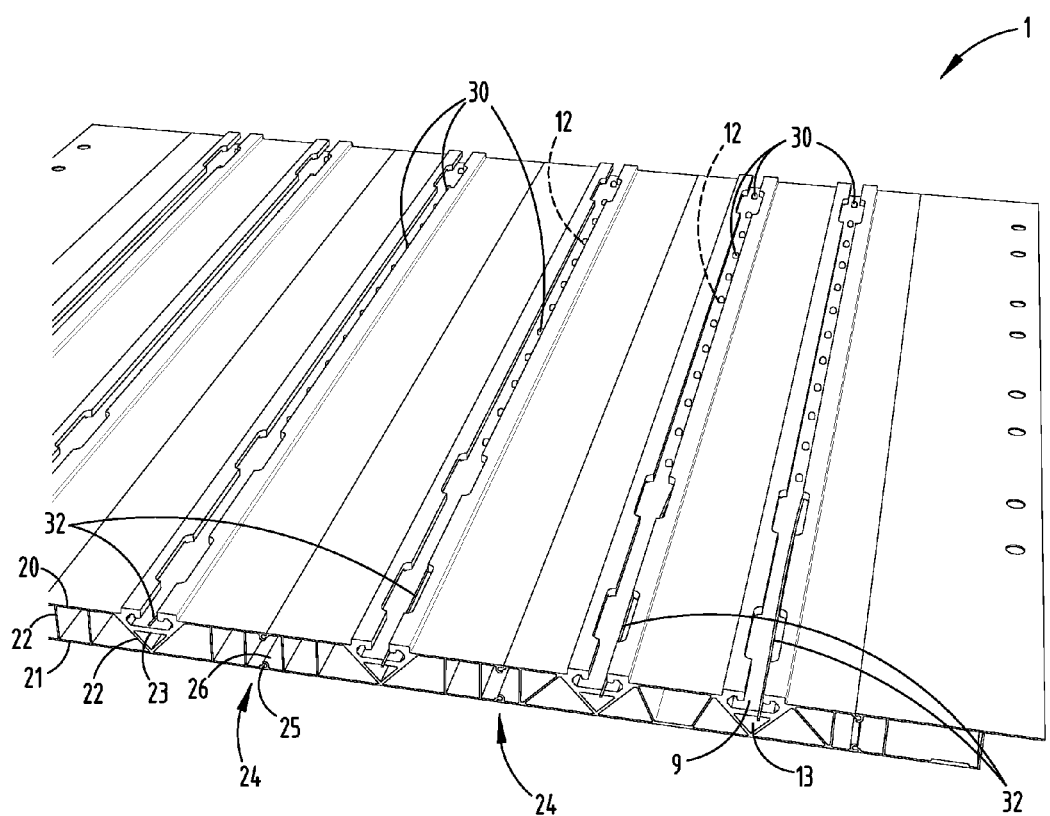
FIG. 3 is an enlarged perspective view of a part of the loading floor shown in FIG. 2.

As shown in the enlarged view of FIG. 3, the profiled elements 2, 3, 4, 5, 6, 7 in each case have on their upper and lower faces a substantially smooth upper structure 20 and/or lower structure 21, wherein the lower structure 21 is configured for fastening to a supporting structure or to a floor panel of the vehicle. The upper and lower structures 20, 21 are connected together to increase the rigidity of the loading floor 1 by struts 22 passing through in the longitudinal direction. Also, the base of the longitudinal groove 9 may serve as a further strut 23 arranged between two struts 22 for improving the stability of the loading floor.

The connecting elements 24, by means of which the profiled elements 2, 3, 4, 5, 6, 7 are connected together, may also be seen in FIG. 3. In the exemplary embodiment shown, the connecting elements 24 are configured for producing a positive connection, for example as lips 25 which form latching grooves, into which latching projections 26 engage. The loading floor 1 may be produced from the profiled elements 2, 3, 4, 5, 6, 7 produced as extruded profiles, cut to length and provided with the bores 12, 19 as well as the lamps contained therein and the supply lines, for example by being laterally joined together or even by being inserted in the longitudinal direction.

For the sake of clarity, not all reference numerals are shown in all the figures. Reference numerals not referred to in the text have the same meaning as in the remaining figures.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A loading floor for a vehicle, comprising:
   a plurality of profiled elements elongated in a longitudinal direction and arranged laterally adjacent to one another and connected along the mating surfaces of each adjacent profiled element, wherein each profiled element includes a strut of a substantially constant height extending the longitudinal length of the profiled element;
   a centrally located through-channel in the longitudinal direction disposed between an upper structure and a lower structure of each profiled element, the through-channel open on both ends; and
   a lamp disposed in the channel.

2. The loading floor as claimed in claim 1, wherein the at least one through-channel in the longitudinal direction is formed between at least one of an upper structure, a lower structure and the strut connecting the upper and lower structures of a profiled element.

3. The loading floor as claimed in claim 1, wherein the supply line is connected in an end region of the channel to an on-board electrical power supply of the vehicle.

4. The loading floor as claimed in claim 1, wherein the loading floor comprises a plurality of lamps which have at least one of different colors, degrees of brightness and opening angles.

5. The loading floor as claimed in claim 4, wherein the plurality of lamps are connected to different supply lines depending on at least one of color, brightness and opening angle, said supply lines being able to be connected independently of one another to an on-board electrical power supply of the vehicle.

6. The loading floor as claimed in claim 1, wherein the loading floor comprises a plurality of lamps which have different colors, degrees of brightness and opening angles.

7. The loading floor as claimed in claim 6, wherein the plurality of lamps are connected to different supply lines depending on color, brightness and opening angle, said supply lines being able to be connected independently of one another to an on-board electrical power supply of the vehicle.

8. The loading floor as claimed in claim 1, wherein the at least one lamp comprises an LED strip.

9. The loading floor as claimed in claim 1, wherein the loading floor has at least one longitudinal groove, and wherein the lamp is arranged in the longitudinal groove.

10. The loading floor as claimed in claim 1, wherein the loading floor comprises an electrical connector socket for connecting further consumer electronic devices.

11. A profiled element for a vehicle loading floor comprising:
    a centrally located through-channel extending in a longitudinal direction of the profiled element having an open top portion partially narrowed by a lateral projection in an upper region;
    a lamp;
    a supply line guided in the channel for supplying power to the lamp; and
    a lid substantially extending the length of the through-channel in the longitudinal direction above the lamp and below an upper structure.

12. The loading floor as claimed in claim 11, wherein the through-channel in the longitudinal direction is formed between at least one of an upper structure, a lower structure and a strut connecting the upper and lower structures of a profiled element.

13. The loading floor as claimed in claim 11, wherein the supply line is connected in an end region of the channel to an on-board electrical power supply of the vehicle.

14. The loading floor as claimed in claim 11, wherein the loading floor comprises a plurality of lamps which have at least one of different colors, degrees of brightness and opening angles.

15. The loading floor as claimed in claim 14, wherein the plurality of lamps are connected to different supply lines depending on at least one of color, brightness and opening angle, said supply lines being able to be connected independently of one another to an on-board electrical power supply of the vehicle.

16. The loading floor as claimed in claim 11, wherein the at least one lamp comprises an LED strip.

17. The loading floor as claimed in claim 11, wherein the loading floor has at least one longitudinal groove, and wherein the lamp is arranged in the longitudinal groove.

18. The loading floor as claimed in claim 11, wherein the loading floor comprises an electrical connector socket for connecting further consumer electronic devices.

19. A loading floor for a vehicle, comprising:
    first and second elongated profiled elements disposed adjacently in a longitudinal direction;
    a groove disposed on the first elongated profiled element;
    a projection disposed on the second elongated profiled element engageable with the groove, wherein the groove and projection extend in the lateral direction;
    a through-channel in the longitudinal direction having a lamp therein; and
    a supply line guided in the channel for supplying power to the lamp, wherein the lamp and the supply line are disposed between an upper structure and a lower structure of each of the first and second profiled elements.

20. The loading floor of claim 19, wherein the loading floor comprises a plurality of lamps which have at least one of different colors, degrees of brightness and opening angles.

* * * * *